Jan. 4, 1927.
E. G. GRAB
1,613,452
RETORT FOR TREATMENT OF FRUIT
Filed Dec. 19, 1925
5 Sheets-Sheet 2

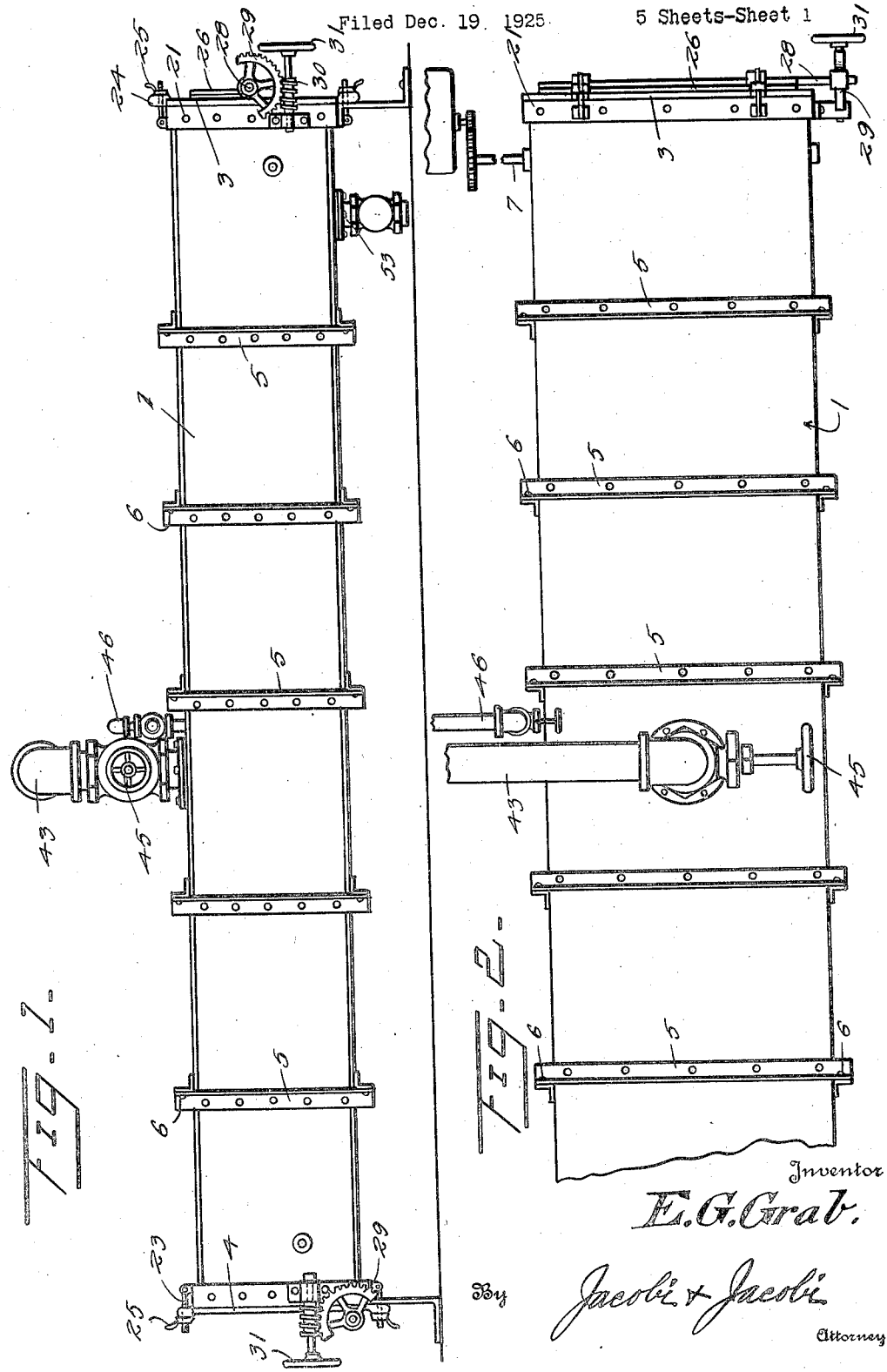

Inventor
E. G. Grab
By Jacobi & Jacobi
Attorneys

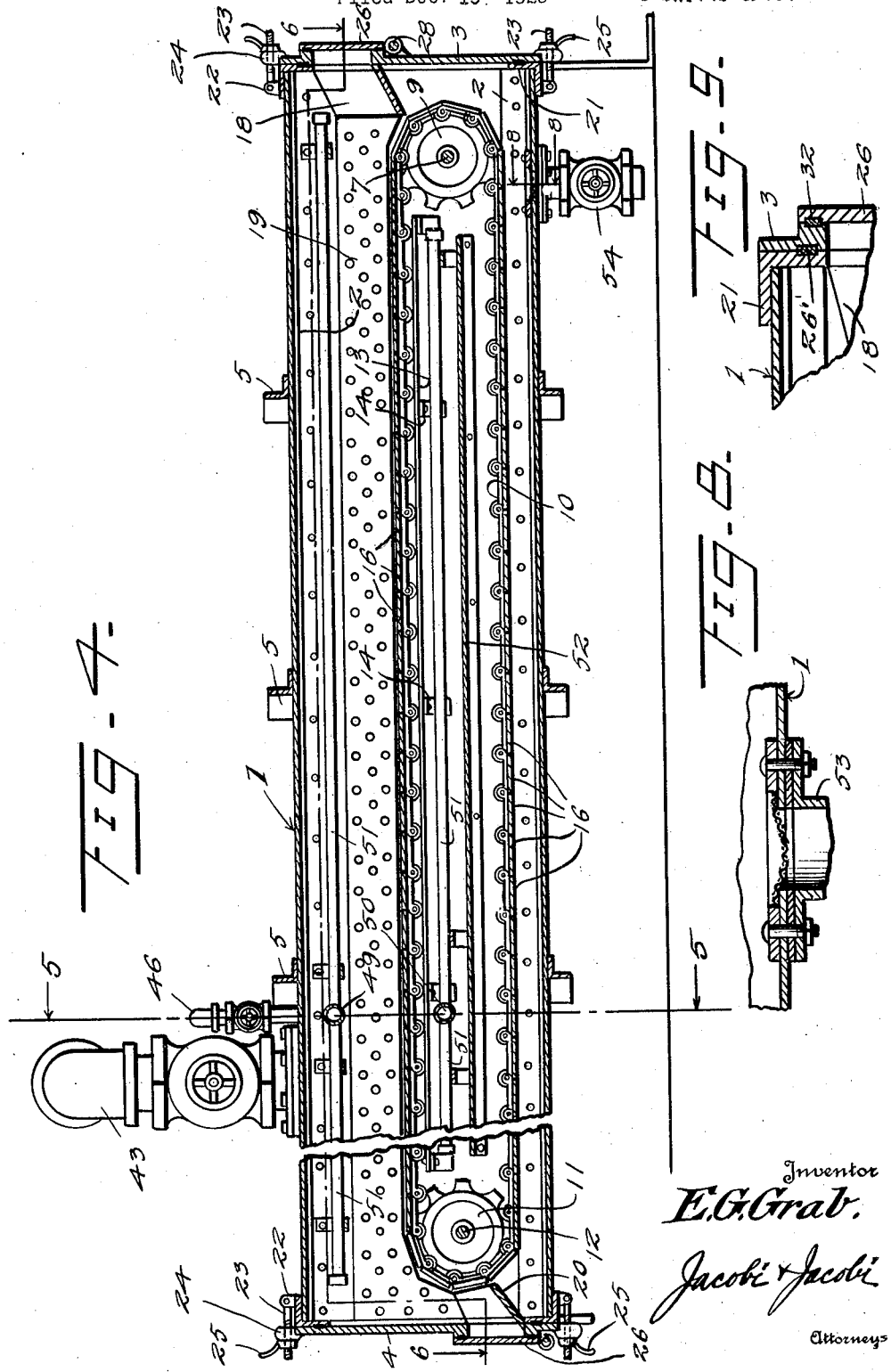

Jan. 4, 1927.　　　　　　　　　　　　　　　　1,613,452
E. G. GRAB
RETORT FOR TREATMENT OF FRUIT
Filed Dec. 19 1925　　　5 Sheets-Sheet 4
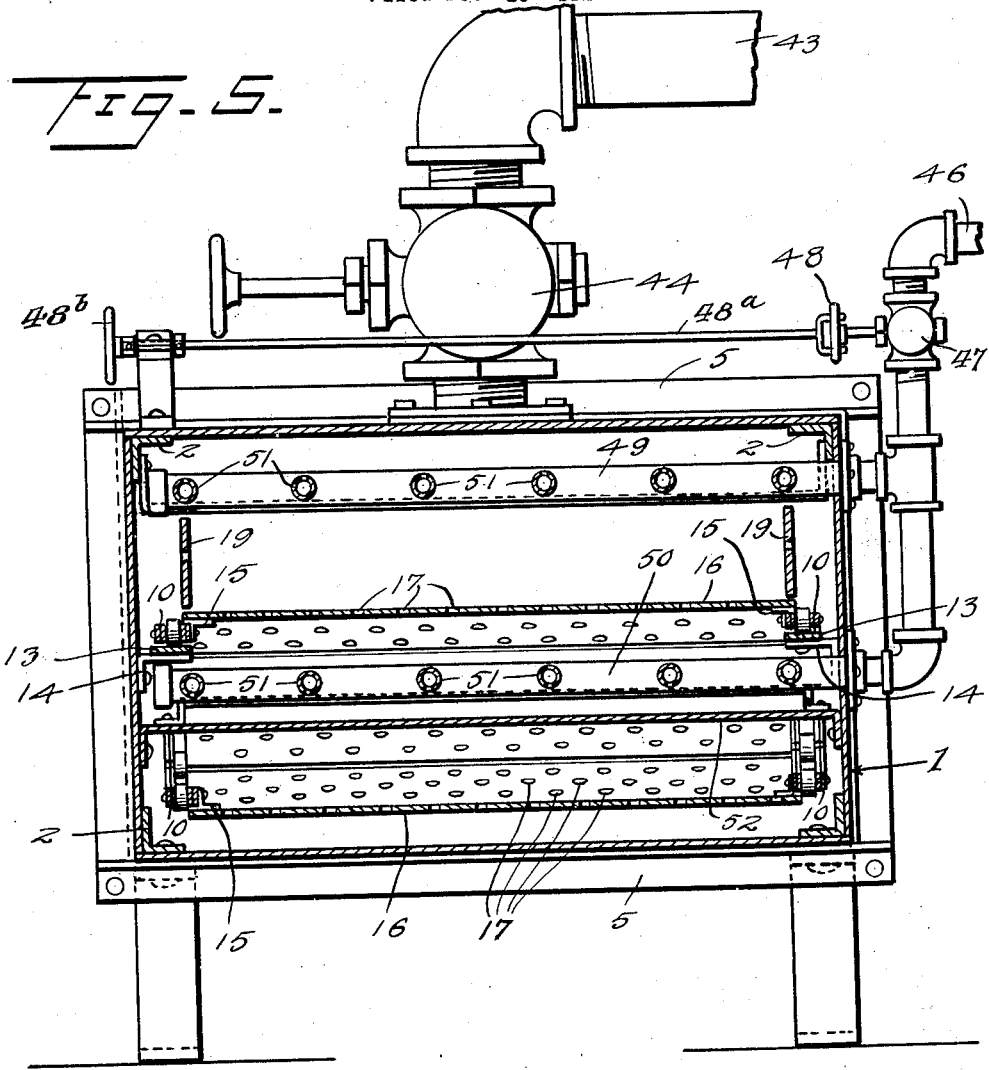
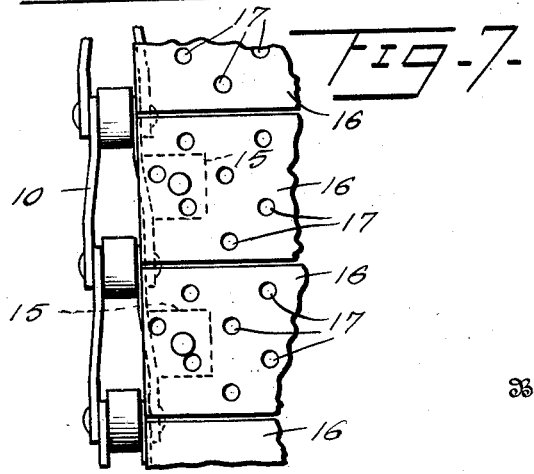
Inventor
E. G. Grab.
By Jacobi & Jacobi
Attorneys

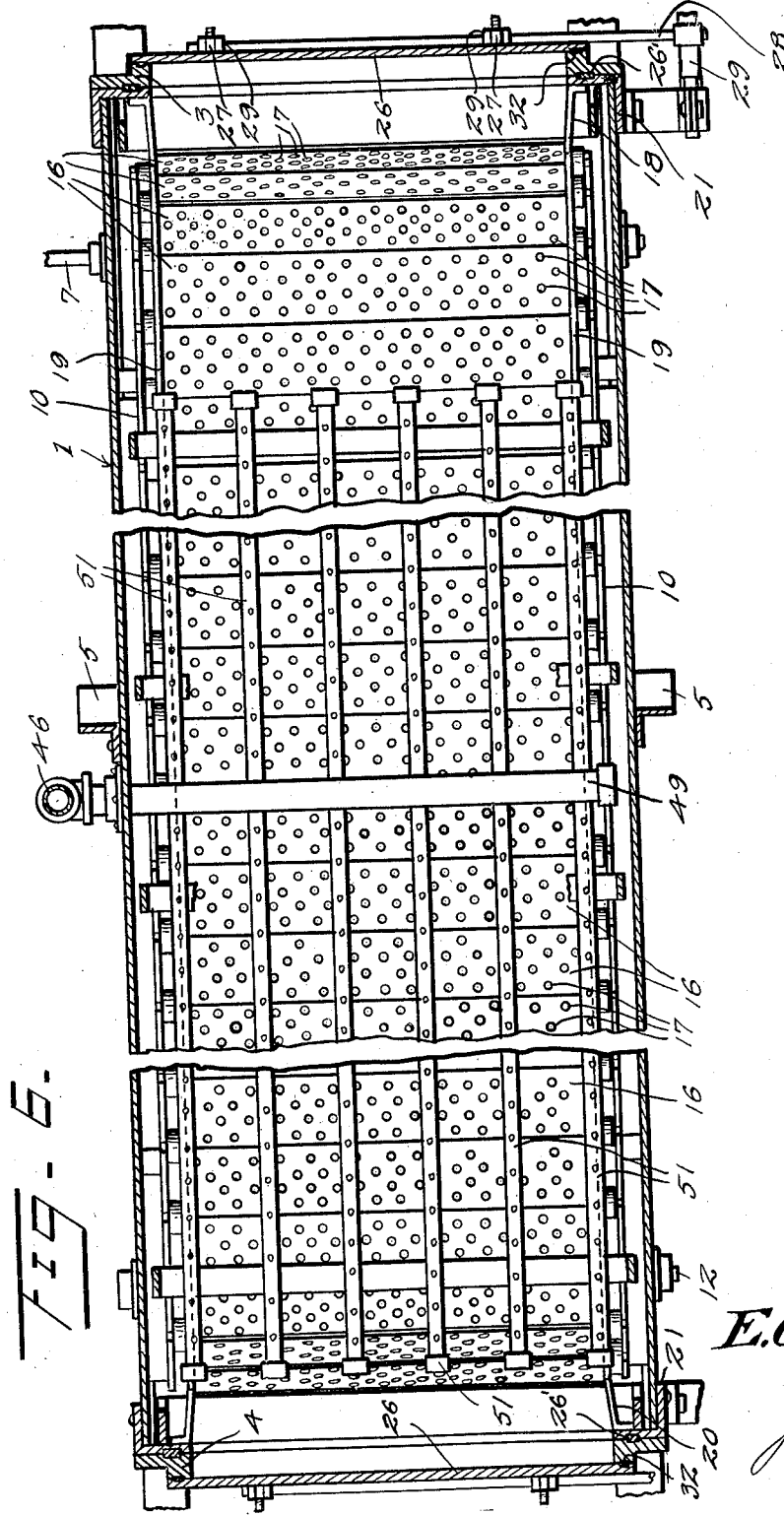

Patented Jan. 4, 1927.

1,613,452

UNITED STATES PATENT OFFICE.

EUGENE G. GRAB, OF NASHVILLE, TENNESSEE.

RETORT FOR TREATMENT OF FRUIT.

Application filed December 19, 1925. Serial No. 76,517.

This invention relates to new and useful improvements in retorts and more particularly to a retort for use in the treatment of fruit and similar articles for canning purposes and the primary object of the invention is to provide an efficient device for carrying out my improved method of treating fruits for canning purposes, as set forth in my Patent Number 1,557,358, issued Oct. 13, 1925.

In my patent mentioned aforesaid, I have set forth an improved method for the treatment of fruits and the like, whereby a "solid pack" is produced and the apparatus, including the retort, heretofore used in carrying out this method, as disclosed in said patent, does not provide for a quantity of fruit being treated in the retort and will cause the loss of considerable time in the treatment of the fruit. Further the apparatus heretofore used required the use of additional apparatus for the removal of the crates containing the fruit from the retort after said fruit has been treated.

An object of my invention is to provide a simple retort which will accommodate a large quantity of fruit and allow the same to be fed thereto and removed from said retort in the least possible time and with the least possible labor and expense being involved.

A further object of the invention resides in the provision of a retort in which is provided an endless carrier upon which the fruit or other product is deposited, the fruit being retained on said carrier while it is treated within the retort and a still further object resides in providing means whereby said fruit or other products may be readily deposited on the carrier and removed therefrom from opposite ends of the retort.

Still another object resides in providing an improved means for distributing the steam throughout the retort in such fashion as will enable said steam to be equally distributed to the product being treated within said retort.

A still further object resides in providing a retort of the character mentioned which is comparatively simple and durable in construction, inexpensive to manufacture and one which will be very efficient and useful in operation.

With these and other objects in view my invention consists in the novel features of construction, combination and arrangement of parts which will be hereinafter referred to and more particularly pointed out in the specification and claims.

In the accompanying drawings, forming a part of this application—

Figure 1 is a side elevation of a retort constructed in accordance with my invention.

Figure 2 is a plan view thereof with parts broken away.

Figure 4 is a vertical longitudinal section through the retort.

Figure 5 is a transverse vertical section therethrough as seen on line 5—5 of Figure 4.

Figure 6 is a horizontal section through the device as seen on line 6—6 of Figure 4.

Figure 7 is a detail plan view of a section of the chain or carrier.

Figure 8 is a detail sectional view as seen on line 8—8 of Figure 4, and

Figure 9 is a detail sectional view through the closure at the admission or front end of the retort.

Figure 3:
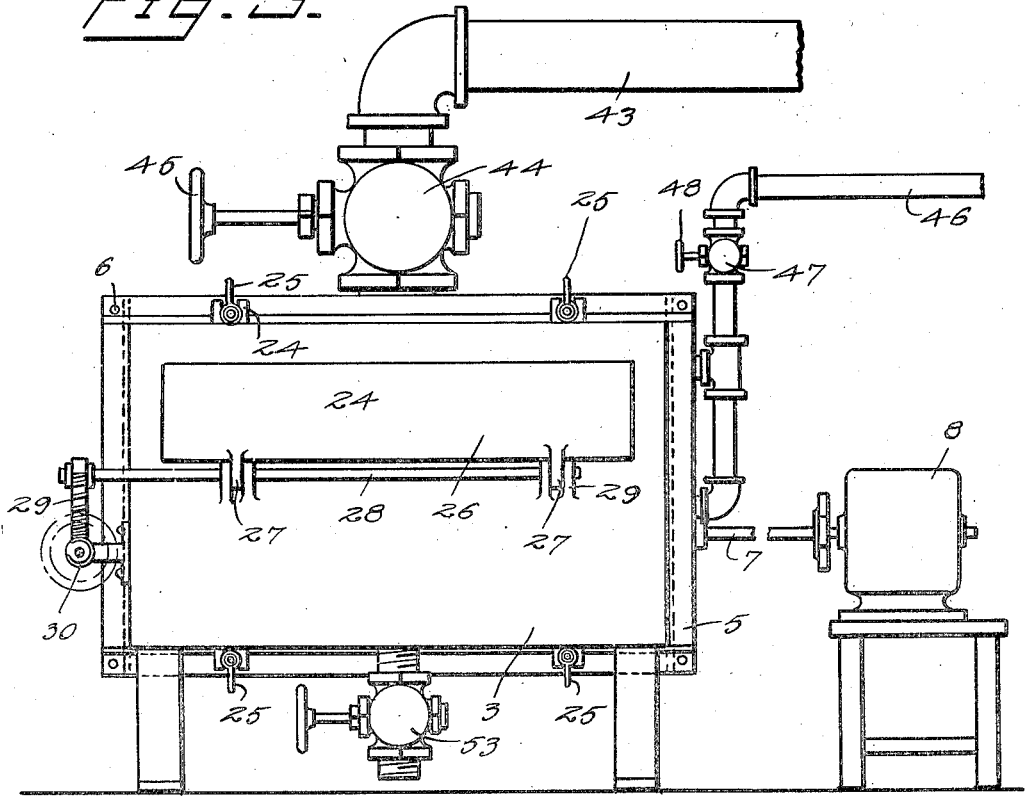
Figure 3 is a front end elevation of the device.

To set forth more clearly the particular purposes of my improved retort, I shall refer to such descriptive matter in my Patent 1,557,358, issued October 13, 1925, as I deem necessary to a clear understanding of the invention. In the ordinary treatment and canning of fruit, a considerable quantity of water, air and gases is present in the can so that when a purchaser obtains any size can of such fruit, a full measure of the fruit does not exist. The existence of a quantity of water in a can reduces the quality of the fruit and further increases the cost of shipment of such cans of fruit, due to the fact that water is heavier than the fruit.

In producing what is known as "solid pack" apples, the idea is to remove the great quantity of water which is ordinarily present in the cans and in so doing, in carrying out my improved process of treatment, the quality of the fruit is greatly improved. A "solid pack" of apples is conspicuously devoid of any quantity of water when canned, and a full measure of fruit is provided and the consumer receives full value for his money. In carrying out this process of producing a "solid pack", referred to in my Patent Number 1,557,358, the air and gases are excluded to a minimum degree from the fruit and my improved retort covered in the present application is designed and constructed to carry out the aforesaid "solid pack" process.

In describing my invention I shall refer to the drawings, in which similar reference characters designate corresponding parts throughout the several views and in which I designate a shell or body composed of top, bottom and side walls formed of metal and held together securely by means of the internal angle strips 2. The numeral 3 designates the front end wall and the numeral 4 designates the rear end wall of the retort, the detail structure of said end walls being described herebelow.

The particular formation of the retort as shown and above described is rectangular in cross section, which is preferable, although a cylindrical retort may be used. In order to retain the walls of the retort in proper position against all forces, I provide a plurality of angle bars 5 which are mounted to extend at regular intervals across the top, bottom and side walls and which are riveted or otherwise secured together at 6 shown in Figure 5 of the drawings. Thus, the greatest possible strength is given the walls of this body.

Extending transversely through the rear end of the body 1 and mounted for rotation in bearings carried in the side walls of the retort, is a drive or power shaft 7 which is connected in any preferred manner with a motor 8 (see Fig. 3). Sprocket chains 9 are mounted on the shaft 7 over which extend the endless chains 10 forming a portion of an endless carrier, the details of which will be hereinafter and more particularly described. These chains 10 also extend over the sprockets 11 carried on an idle shaft 12 which is supported in bearings carried in the side walls of the retort at the rear end thereof. These chains 10 are of the link and roller type and are supported in their movement longitudinally by the longitudinal tracks or rails 13 carried by the angle bracket 14. The inner links of the chains 9 have formed or cast thereon the angular lugs 15 which project inwardly and afford supporting means for the transverse slats 16 which form the carrying element of the endless carrier formed by said slats and chains. The slats 16 are perforated, as shown at 17, and said slats are riveted or otherwise similarly secured to the lugs 15 at their ends, as clearly shown in Figure 7 of the drawings. While the slats form a support for material to be conducted through the retort as the carrier is operated, it is obvious that the openings 17 will admit steam to pass therethrough, as is necessary in carrying out my process.

Mounted on the inner face of the front end wall 3 is a chute 18 which leads from an opening in said wall to a point adjacent the forward end of the endless carrier. The fruit is adapted to be projected through the chute to the carrier and is carried to the opposite end of the retort, said fruit being held in position on the slats of the carrier through the medium of the longitudinally extending and perforated guard rails 19.

The rear end wall 4 of the retort is provided with an opening to which leads a downwardly inclined chute 20 so positioned that the fruit from the endless carrier may be directed to said chute and thus conducted through the exit opening in the retort. The guard rails 19 are shaped at their ends to conform somewhat to the outline of the chutes 18 and 20 so that there will be no loss of fruit within the retort from the carrier as the latter is operated.

Mounted at the end of the retort is a bracket-like casting 21 upon which are formed at intervals the ears 22. Mounted between the pairs of ears 22 are the pivotally supported bolts 23. Carried on the walls 3 and 4 at predetermined intervals are the slotted gears 24 between which the bolts 23 are adapted to project, so that when the nuts 25 are turned home, the walls 3 and 4 will be securely retained in position against the brackets 21. Gaskets 26' are provided between the walls 3 and 4 and the brackets 21 so as to provide an air proof connection.

The opening in the front wall 3 is adjacent the upper end thereof whereas the opening in the wall 4 is adjacent the lower end, the former being the entrance opening and the latter being the exit opening to the retort. These openings are adapted to be covered by the hinged doors 26. Each door is provided with their depending ears 27 which afford means for securing the door to a shaft 28. The ears project through bearings 29 and the end of the shaft 28 has a gear segment 29' mounted thereon. The gear segment connects with a worm 30 operated through the medium of a handle 31 and obviously the door 26 may be opened or closed manually through the operation of the handle 31. A gasket 32 is adapted to be positioned between the door 26 and the end wall against which the same rest surrounding the opening in said end wall, so as to further provide an air proof connection. While I have described the operating mechanism as applied to one end of the retort, it is understood that the same construction is applied to both ends so as to provide an identical operating means for both doors at the entrance and exit ends of the retort.

Figure 10:
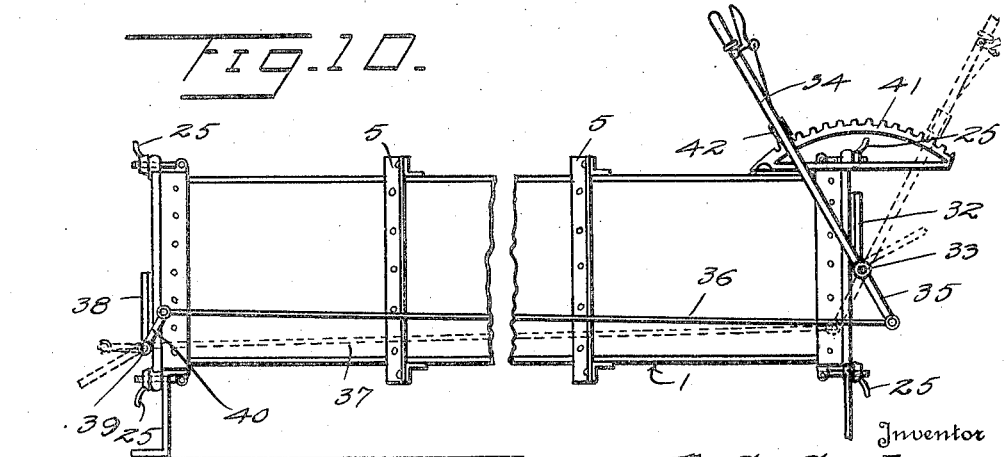
Figure 10 is a side elevation of a retort embodying a slightly modified form of the invention.

In Figure 10 of the drawing, I have shown a slightly modified form of the invention which discloses means for actuating the doors at the end of the retort simultaneously. The door 32 is connected with a shaft 33 which has mounted thereon a lever 34. The lower end of the lever projects below the shaft 33, as shown at 35 and has pivotal connection with a pitman 36 extending longitudinally of the retort 37. The opposite end door 38 is carried on a shaft 39, the latter being connected at its end with a crank 40. The opposite end of the pitman 36 has pivotal connection with the crank 39 and as the lever 34 is actuated in one direction the doors are closed and when actuated in the opposite direction both doors are opened simultaneously. A rack 41 is mounted on the upper end of the retort at the entrance end thereof and a pawl 42 carried on the lever 34 is adapted to engage the teeth of said rack to retain the lever 34 in any adjusted position.

In carrying out the process for which my improved retort has been designed, it is necessary to extract the air from the retort in order to form a partial vacuum therein and to this end I provide the pipe 43 which is connected at its one end to the retort through the top of the latter and at its other end to a suction pump (not shown). A valve cage 44 is arranged in the pipe 43 in which is mounted a valve controlled by the operating handle 45, so that the action of the vacuum pump may be controlled at the will of the operator.

Also in carrying out my process for which the present invention has been designed, it is necessary to inject steam into the retort, so that I have provided in connection with the latter a steam inlet pipe 46 in which is disposed a valve 47 controlled by the manually operable handle 48. The steam pipe 46 connects with a source of supply (not shown) whereby steam under great pressure may be directed to the retort when desired.

The steam pipe 46 extends downwardly along side of the retort and has connected therewith the upper and lower lead pipes 49 and 50, respectively, which extend transversely of the retort. These lead pipes have their free ends closed and terminate adjacent the opposite side wall of said retort. The upper lead pipe 49 is adjacent the top wall of the retort, while the lower lead pipe is approximately in a plane midway of the top and bottom walls of said retort. For convenience I shall refer to the lead pipes 49 and 50 as transverse lead pipes.

The transverse lead pipes 49 and 50 extend through the retort about midway of the ends thereof and connected with said pipes 49 and 50 are a series of longitudinal lead pipes 51, extending in opposite directions toward both ends of the retort. The outer ends of these longitudinal lead pipes 51 are closed and the longitudinal pipes 51 connected with the upper transverse pipe 49 are provided with a series of spaced apart openings or perforations facing upwardly while the pipes 51 connected with the lowermost transverse pipe 50 are provided with a similar series of openings or perforations facing downwardly, as clearly shown in Figure 5 of the drawings. Secured to the inner faces of the side walls of the retort are the downwardly bent ends of a longitudinally disposed baffle plate 52 positioned just below the series of lowermost longitudinal pipes 51, as clearly shown in Figures 4 and 5 of the drawings. The upwardly facing openings in the uppermost series of pipes 51 permit the steam projecting therethrough to strike the top wall of the retort, causing the steam to be reflected downwardly and in various directions, while the downwardly facing openings in the lowermost series of pipes 51 permit the steam to be directed against the baffle plate 52 whereby the steam is reflected upwardly and in various directions against the contents of the carrier. It will be noted in this connection that the pipes 51 connected with the transverse pipe 50 are disposed between the upper and lower portions of the endless carrier and the baffle plate 52 is also disposed therebetween. Thus the steam from the upper pipes 51 will be directed first upwardly and then downwardly by reflection to the contents of the carrier and the steam from the lower pipes 51 will be directed downwardly against the baffle plate and then upwardly to the contents of the carrier. In this manner the steam will be equally distributed to the contents throughout the retort.

In the bottom wall of the retort adjacent one end thereof is a drain pipe 53 in which is arranged a manually operated valve 54, for obvious purposes.

In practice, to place my device in operation, I first start the motor 8 in operation which obviously starts the endless carrier in operation. The door 26 at the entrance or front of the device is opened whereupon the fruit is directed into the retort through the chute 18. This device is particularly applicable to use in the canning of apples but it will be understood that other fruits or vegetables may be treated in this retort. As the fruit is fed to the retort, the same will be received on the endless carrier and moved rearwardly towards the exit end of said retort, being guided through the guard rails 19. When the contents of the carrier reach the rear end of the retort, the motor is stopped and of course the carrier discontinues its operation. By this time a large quantity of fruit is contained within the retort and the door 26 at the entrance end is closed tightly and the operator makes certain that the opposite end door is also closed tightly. The vacuum pump is then set in operation and the valve in the vacuum pipe opened so that air within the retort may be extracted to form a partial vacuum therein. In extracting the air from the retort, the air and gases from the apples on the carrier will also be extracted, which is extremely important and essential in carrying out my process, as set forth in my Patent Number 1,557,358.

When the proper amount of vacuum has been formed in the retort, which may be determined by the use of a gauge (not shown), the operation of the vacuum pump is discontinued and the connection between the vacuum pipe and the retort closed. Live steam is then promptly admitted to the retort through the opening of the valve 47. The steam is circulated throughout the retort through the medium of the particular construction of steam pipes and, as stated previously, an equal distribution of steam is obtained through the direction of the outlet openings in certain pipes being directed upwardly and certain outlet openings in other pipes directed downwardly. Steam is admitted to the fruit from the top and also from the bottom, in view of the fact that the pipes are disposed above and below the portion of the carrier supporting the fruit.

The introduction of steam to the retort through the medium of the openings in the pipes 51, as stated, permits said steam to be thoroughly circulated throughout the interior of the retort and a slight preliminary cooking of the apples on the carrier takes place; although this cooking is unessential and quite unimportant, as the cooking process is conducted later after the fruit has been removed and placed in the cans. Upon the extraction of the air and gases from the fruit, due to the formation of the partial vacuum within the retort, the cell walls of said fruit have a tendency to collapse and said cell walls actually collapse upon the introduction of the steam to the retort, thus shrinking the fruit.

As stated, the steam is promptly introduced to the retort when a predetermined amount of vacuum has been formed therein and sufficient steam is so introduced until the vacuum is overcome, thus eliminating opportunity for the return of air and gases to the cells of the fruit. This being accomplished, the fruit is then ready to be removed from the retort and the door 26 at the exit end of the retort is opened whereupon the motor 8 is set in operation to operate the endless carrier. As the carrier is operated, the fruit thereon will be automatically discharged from the retort through the chute 20 into a container or containers which may be placed at the discharge end of the retort.

After the apples or other fruits are removed from the retort, the same may be further treated and made ready for canning under my improved process set forth in Patent 1,557,358. When one lot of fruit has been treated in the manner heretofore described, the retort may be again ready for operation with a further quantity thereof.

In this manner it will be seen that large quantities of fruit may be treated at one and the same time with the least amount of labor, time and expense being involved.

From the foregoing description of the construction of my improved retort, the operation thereof will be readily understood and it will be seen that I have provided a simple, comparatively inexpensive and efficient means for carrying out the objects of the invention.

While I have illustrated and described the elements best adapted to form the functions set forth, it is obvious that various changes in form, proportion and in the minor details of construction may be resorted to, without departing from the spirit or sacrificing any of the principles of the invention.

In Figure 5 of the drawings I have shown an added element in the form of an extension arm and handle connectable with the valve operating handle 48, so that the valve 47 may be operated from the opposite side of the retort. The extension arm is designated by numeral 48$^a$ and the handle therefor by the numeral 48$^b$.

Having thus described my invention, what I claim is:

1. Apparatus for the treatment of fruit comprising a closed retort, suction means for rarefying the air in the retort, a conveyor for carrying the fruit along the retort, means for admitting steam into the retort and means for rebounding the steam toward the fruit as it passes through the retort.

2. Apparatus for treating fruit comprising a retort, means for rarefying the air in the retort, a conveyor for carrying the fruit through the retort, steam pipes leading into the retort and having outlet openings disposed away from the run of the conveyor which carries the fruit and means for rebounding the steam toward the fruit.

3. Apparatus for treating fruit comprising a retort, means for rarefying the air in the retort, an endless conveyor mounted for orbital movement in the retort and having an upper run adapted to carry the fruit, steam pipes located at the opposite sides of the upper run of the conveyor and having openings disposed away from said run and plates disposed opposite the openings of the pipe and adapted to serve as means for rebounding the steam toward the upper run of the conveyor.

4. Apparatus for treating fruit comprising a retort, means for rarefying the air therein, the said retort having at one end an inlet chute and at its opposite end an outlet chute, an endless conveyor mounted for orbital movement within the retort and between the said chutes, steam pipes located at the opposite sides of the upper run of the conveyor and means located within the retort for rebounding the steam from the pipes towards the upper run of the conveyor.

In testimony whereof I affix my signature.

EUGENE G. GRAB.